US008762740B2

(12) United States Patent
Kanai (10) Patent No.: US 8,762,740 B2
(45) Date of Patent: Jun. 24, 2014

(54) INFORMATION PROCESSING SYSTEM AND INFORMATION PROCESSING METHOD (71) Applicant: Hirofumi Kanai, Tokyo (JP)

(72) Inventor: Hirofumi Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/665,178

(22) Filed: Oct. 31, 2012

(65) Prior Publication Data
US 2013/0124884 A1 May 16, 2013

Related U.S. Application Data (62) Division of application No. 12/550,161, filed on Aug. 28, 2009, now Pat. No. 8,438,407, which is a division of application No. 10/779,633, filed on Feb. 18, 2004, now Pat. No. 7,603,567.

(30) Foreign Application Priority Data

Feb. 20, 2003 (JP) ................................ 2003-043030

(51) Int. Cl.
G06F 9/44 (2006.01)
G06F 13/14 (2006.01)

(52) U.S. Cl.
USPC ............ 713/190; 713/192; 713/310; 713/323

(58) Field of Classification Search
None
See application file for complete search history.

(56) References Cited

U.S. PATENT DOCUMENTS

| 4,787,027 A | 11/1988 | Prugh et al. |
| 4,997,288 A | 3/1991 | Rosenow |
| 5,212,797 A | 5/1993 | Miyake et al. |
| 5,267,323 A | 11/1993 | Kimura |
| 5,504,908 A | 4/1996 | Ikeda |
| 5,642,458 A | 6/1997 | Fukushima et al. |
| 5,652,891 A | 7/1997 | Kitamura et al. |
| 5,717,582 A | 2/1998 | Duong |
| 5,838,983 A * | 11/1998 | Atkinson ...................... 713/322 |

(Continued)

FOREIGN PATENT DOCUMENTS

| CN | 1308262 A | 8/2001 |
| EP | 0475297 A2 | 3/1992 |

(Continued)

OTHER PUBLICATIONS

Notification of Reasons for Rejection in Japanese Patent Application No. 2003-043030, mailed Sep. 27, 2005, 4 pages.

(Continued)

Primary Examiner — Venkat Perungavoor
(74) Attorney, Agent, or Firm — Finnegan, Henderson, Farabow, Garrett & Dunner, LLP (57) ABSTRACT An information processing system has a power supply section which detects a predetermined potential applied to a USB terminal and supplying the potential as a source potential, an information detection section which detects the predetermined information supplied to the USB terminal, and a processing section which executes, subsequent to the detection of the predetermined potential, the encoding process or the decoding process in accordance with at least the operating information supplied from the operation key arranged on the body and in accordance with the predetermined information supplied to the USB terminal after detection of the predetermined information. The recording and reproducing operation can be performed with the operating key on the body with power supplied only from the USB terminal.

18 Claims, 6 Drawing Sheets

(56) References Cited

U.S. PATENT DOCUMENTS

| | | |
|---|---|---|
| 5,948,085 A | 9/1999 | Blatter |
| 5,964,878 A | 10/1999 | Ryu |
| 6,330,668 B1 | 12/2001 | Curiger et al. |
| 6,412,076 B1 | 6/2002 | Honda et al. |
| 6,647,435 B1 | 11/2003 | Koh et al. |
| 2001/0056509 A1 | 12/2001 | Iwata |
| 2002/0023236 A1 | 2/2002 | Obitsu |
| 2002/0115481 A1 | 8/2002 | Saito |
| 2003/0057994 A1 | 3/2003 | Braun et al. |
| 2003/0087541 A1 | 5/2003 | Sato et al. |
| 2003/0115491 A1 | 6/2003 | Williams et al. |
| 2003/0172313 A1 | 9/2003 | Jain et al. |

FOREIGN PATENT DOCUMENTS

| | | |
|---|---|---|
| JP | 2001-184146 | 7/2001 |
| JP | 2001-242965 | 9/2001 |
| JP | 2002-185840 | 6/2002 |

OTHER PUBLICATIONS

Notification of the Second Office Action in Chinese Application No. 2009-10178503.7, dated Feb. 29, 2012, counterpart of parent U.S. Appl. No. 10/779,633, 8 pages.

* cited by examiner

INFORMATION PROCESSING SYSTEM AND INFORMATION PROCESSING METHOD

CROSS-REFERENCE TO RELATED APPLICATIONS

This application is a divisional of U.S. application Ser. No. 12/550,161, filed Aug. 28, 2009, which is a divisional of U.S. application Ser. No. 10/779,633, filed Feb. 18, 2004, issued as U.S. Pat. No. 7,603,567, which is based upon and claims the benefit of priority from the prior Japanese Patent Application No. 2003-043030, filed Feb. 20, 2003. The contents of the above-listed applications are incorporated herein by reference.

BACKGROUND OF THE INVENTION

1. Field of the Invention

The present invention relates to an information processing system for encoding/decoding of digital information, or in particular to an information processing system and an information processing method for supplying power through a serial bus such as a USB terminal.

2. Description of the Related Art

The recent progress of the digital technologies has promoted the development/manufacture and extended the use of the information processing system capable of encoding/decoding of digital information. Also, this digital information processing system has been reduced in size and has come to be widely used as a handy tool for handling digital information.

This information processing system often uses a USB (universal serial bus) terminal for communication with other information processing systems. The USB, which is based on the communication standard and has a power supply other than a signal line, facilitates the connection and disconnection with the system powered on. The USB power terminal, which is very convenient in terms of the communication standard, can also be used to supply power for the information processing system as well as the communication information.

As a conventional technique in this connection, Jpn. Pat. Appln. KOKAI Publication No. 2001-242965 discloses a PC (personal computer) for supplying power to a digital information device through the USB terminal. Thus, power can be supplied to the digital information device, for example, through the USB terminal.

In the conventional PC described above with power supplied to an information device through the USB terminal, however, it is impossible to supply only power to the information device and to perform the control operation by key operation on the part of the information device. Once the operation mode is changed to the PC mode, for example, the operation is possible only with a command issued from the PC. With the home AC power supply, therefore, the normal operation with the operation switch of the information device cannot be performed, which otherwise might be possible by supplying from the USB the DC power rectified by a power adaptor.

Specifically, in the case where power is supplied through the USB terminal from the power adaptor, the information device cannot be operated by the key operation in view of the fact that the same situation prevails as if power is supplied to control the operation by an application on the PC. As a result, the information device remains in standby state until a control signal is supplied to the USB terminal from an external PC. In the case where the control signal fails to be supplied, an error occurs or the standby state lasts, thereby posing the problem that power cannot be supplied from the power adaptor through the USB terminal. Further, in the case where power is supplied from the USB terminal, the control operation is possible only from an external PC, and therefore the control operation, even if desired, by both the operation key of the information device and the external PC cannot be performed.

BRIEF SUMMARY OF THE INVENTION

According to one aspect of the invention, there is provided an information processing system comprising a potential detection section which detects a predetermined potential applied to a USB terminal, a power supply section which supplies the predetermined potential to each component part as a source potential upon detection of the predetermined potential by the potential detection section, an information detection section which detects that predetermined information has been supplied to the USB terminal, and a processing section which executes, after detection of the predetermined potential by the potential detection section, the encoding process or the decoding process in accordance with at least the operating information supplied from the operation key on the body before detection of the predetermined information by the information detection section and in accordance with the predetermined information supplied to the USB terminal after detection of the predetermined information by the information detection section.

BRIEF DESCRIPTION OF THE SEVERAL VIEWS OF THE DRAWING

FIGS. 2A and 2B are diagrams for explaining an example of connection between a digital data recording and reproducing apparatus according to the invention and an external personal computer or the like.

DETAILED DESCRIPTION OF THE INVENTION

Figure 1:
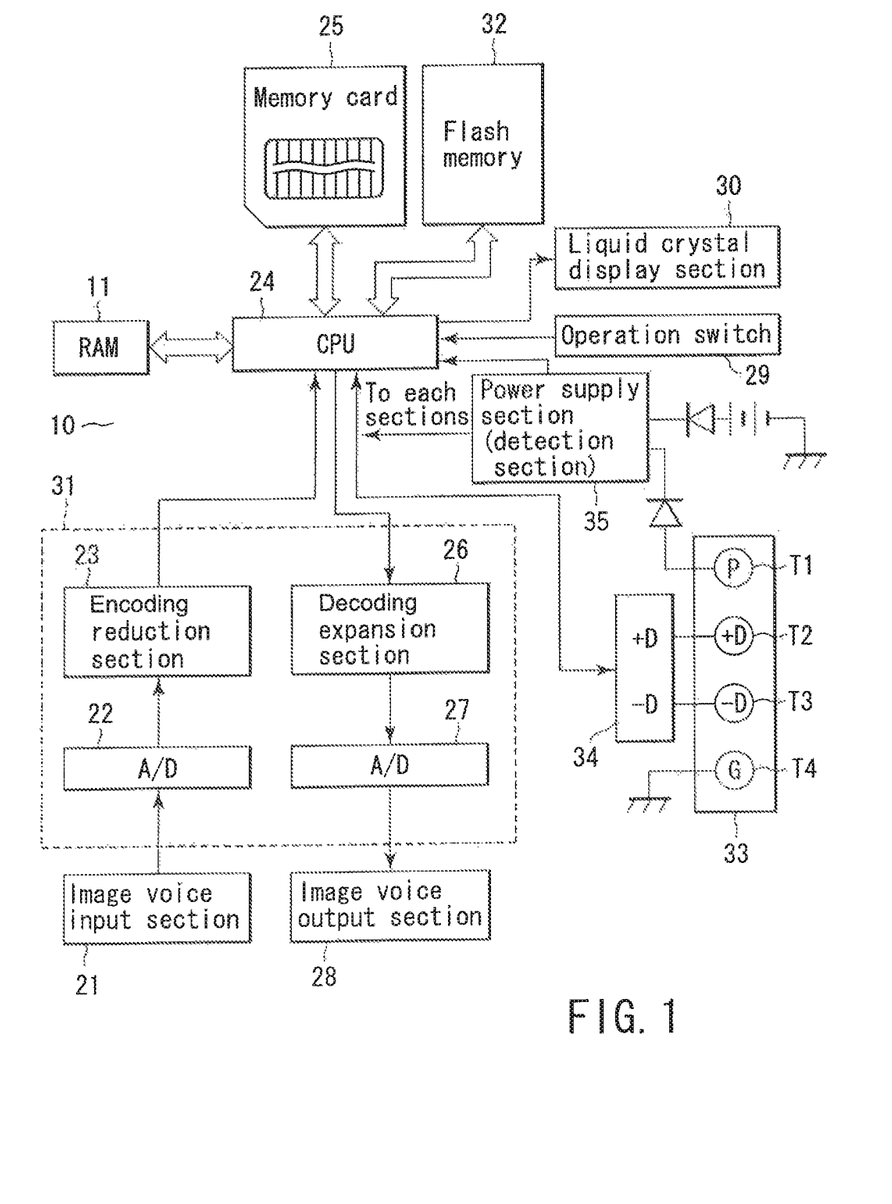
FIG. 1 is a block diagram showing a digital data recording and reproducing apparatus according to an embodiment of this invention.
Figure 2A:
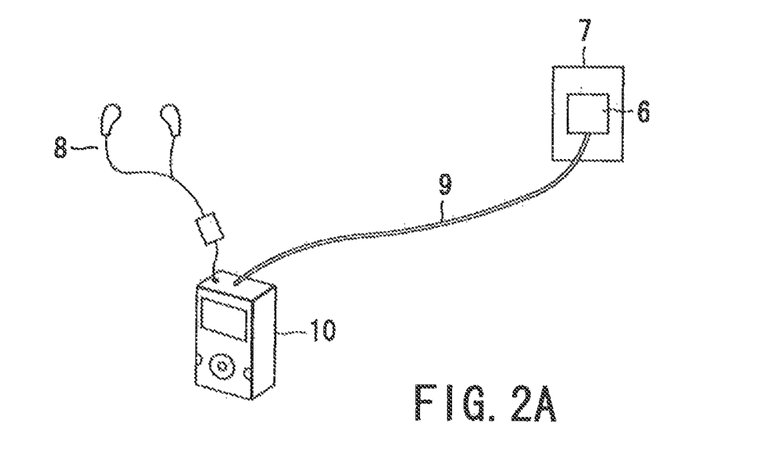
Figure 2B:
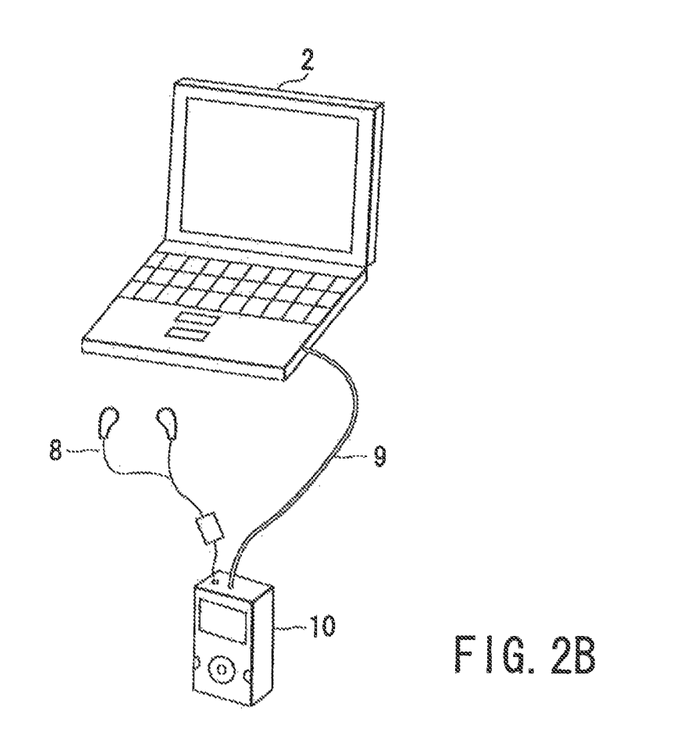

An information processing system according to an embodiment of the invention is explained in detail below with reference to the accompanying drawings. FIG. 1 is a block diagram showing a digital data recording and reproducing apparatus according to an embodiment of this invention. FIGS. 2A and 2B are diagrams for explaining an example of connection between a digital data recording and reproducing apparatus and an external personal computer or the like.

An embodiment of the invention will be explained in detail with reference to the drawings. In the embodiment described below, reference is made to the digital data recording and reproducing apparatus shown in FIG. 1, as an example. In FIG. 1, the digital data recording and reproducing apparatus 10 comprises an image/voice processing integrated device 31 connected to an image/voice input section 21 and an image/voice output section 28, a CPU 24 constituting a control unit and a central processing unit connected to the image/voice processing integrated device 31, a RAM 11 constituting a storage area connected to the CPU 24, a memory card 25 constituting a removable storage medium connected to the CPU 24, a flash memory 32 constituting a built-in storage area connected to the CPU 24, a liquid crystal display section 30 connected to the CPU 24 for displaying the operating information and the like, and an operation switch 29 connected to the CPU 24. The digital data recording and reproducing apparatus further comprises, as a feature of this invention, a USB controller 34 connected to the CPU 24, a power supply section 35 including a potential detection section connected to the USB terminal 33 through a diode, and a battery connected to the power supply section 35 through a diode. The USB terminal 33 includes at least a power terminal T1, control information terminals T2, T3 and a grounding terminal T4.

The microprocessor 24 is connected with an operation switch 29 having an operating input switch for voice recording, image recording, voice/image reproduction or the operation power off for the digital data recording and reproducing apparatus 10, and a liquid crystal display section 30 for indicating the operating condition of the digital data recording and reproducing apparatus 10 in accordance with the input from the operation switch 29.

The nonvolatile memory card 25 is removably mounted in a card slot formed in the housing not shown of the digital data recording and reproducing apparatus 10.

Also, an ND converter circuit 22, an encoding reduction circuit 23, a decoding expansion circuit 26 and a D/A converter 27 are each configured of a one-chip image/voice processing integrated device (hereinafter referred to as the image/voice processing IC) 31.

In this configuration, the digital data recording and reproducing apparatus 10 making up an information processing system according to this invention performs the recording process as described below. Specifically, the image/voice input circuit 21 includes a microphone for collecting the music sound or the voice of men or acquires the image information and generating an analog electrical signal, and an amplifier circuit for amplifying an analog voice signal generated by the microphone or a CCD camera.

The analog image/voice signal generated in the image/voice input circuit 21, in accordance with an initially set basic operating mode, is converted into a digital image/voice signal by an analog-to-digital converter (hereinafter referred to as the ND converter) 22 in accordance with the operating information supplied from the operation switch 29, and the digital image/voice signal is supplied to an encoding reduction circuit 23. The encoding reduction circuit 23 encodes the digital image/voice signal, reduces the data and generates a predetermined digital reduction data. The encoding reduction circuit 23 uses, as an example, the reduction technique specified in the ITU (International Telecommunication Union) standard G729A. The digital encoding reduction data generated in the encoding reduction circuit 23 is recorded in the card having mounted thereon a nonvolatile semiconductor memory (hereinafter referred to as the nonvolatile memory card) 25 or a built-in flash memory 32 through a microprocessor 24. The microprocessor 24 controls the write and read operation of the digital encoding reduction data in the nonvolatile memory 25 or the built-in flash memory 32, while at the same time generating the management data for the digital encoding reduction data written.

Further, the digital data recording and reproducing apparatus 10 constituting the information processing system according to this invention performs the reproducing process as described below. In the digital data recording and reproducing apparatus 10, in accordance with the initially set basic operation mode, the digital encoding reduction data read from the nonvolatile memory cad 25 or the flash memory 32 are expanded by the decoding expansion circuit 26, and after decoding, converted to a digital image/voice signal under the control of the microprocessor 24. The digital image/voice signal generated in the decoding expansion circuit 26 is converted to an analog image/voice signal by the digital/analog converter (hereinafter referred to as the D/A converter) 27, and supplied to the image/voice output circuit 28 configured of an amplifier circuit and a speaker or a display unit thereby to perform the reproducing operation.

Further, in the digital data recording and reproducing apparatus 10 constituting the information processing system according to the invention, in accordance with the initially set basic operation mode, the digital data read from the nonvolatile card 25 or the built-in flash memory 32 can be edited or otherwise processed in accordance with the operating information supplied from the operation switch 29. Also, these digital processes including the recording, reproduction and editing are executed at a source potential supplied from a battery of the power supply section of the digital data recording and reproducing apparatus 10. As an alternative, the processes can be executed by the power supplied from the source potential through the USB terminal as described later. Furthermore, the operating information for these processes is usually supplied by the user operation of the operation switch 29 arranged on the body. Nevertheless, the operating information may alternatively be supplied from the PC 2, for example, as an external device through the USB terminal 33. (Operation mode determining process for the information processing system according to the invention)

In the digital data recording and reproducing apparatus 10 constituting the information processing system according to the invention, the source potential from the power supply section 35 may be supplied from a power adaptor or an external device through the USB terminal 33. In this case, the operating information may be supplied through the operation switch 29 on the body. The operation mode determining process for the information processing system according to the invention is explained in detail below with reference to the drawings and the flowcharts. FIGS. 3 to 6 are flowcharts showing an example of the operation mode determining process for the digital data recording and reproducing apparatus according to the invention.

In FIG. 2A, the digital data recording and reproducing apparatus 10 constituting the information processing system according to the invention is connected to the power adaptor 6 which in turn is connected to an external power supply socket 7 by the USB cable 9 connected to the USB terminal 33. Further, an earphone 8 is connected to the image/voice output section 28. Also, in FIG. 2B, the digital data recording and reproducing apparatus 10 constituting the information processing system according to the invention is connected to an external PC 2 through a USB cable 9 connected to the USB terminal 33, for example. As an alternative, the apparatus 10 may be connected to two USB terminals, one of which is selected by the operation. With the apparatus connected this way, the power supply process and the operation mode determining method will be explained sequentially with reference to the four flowcharts.

Figure 3:
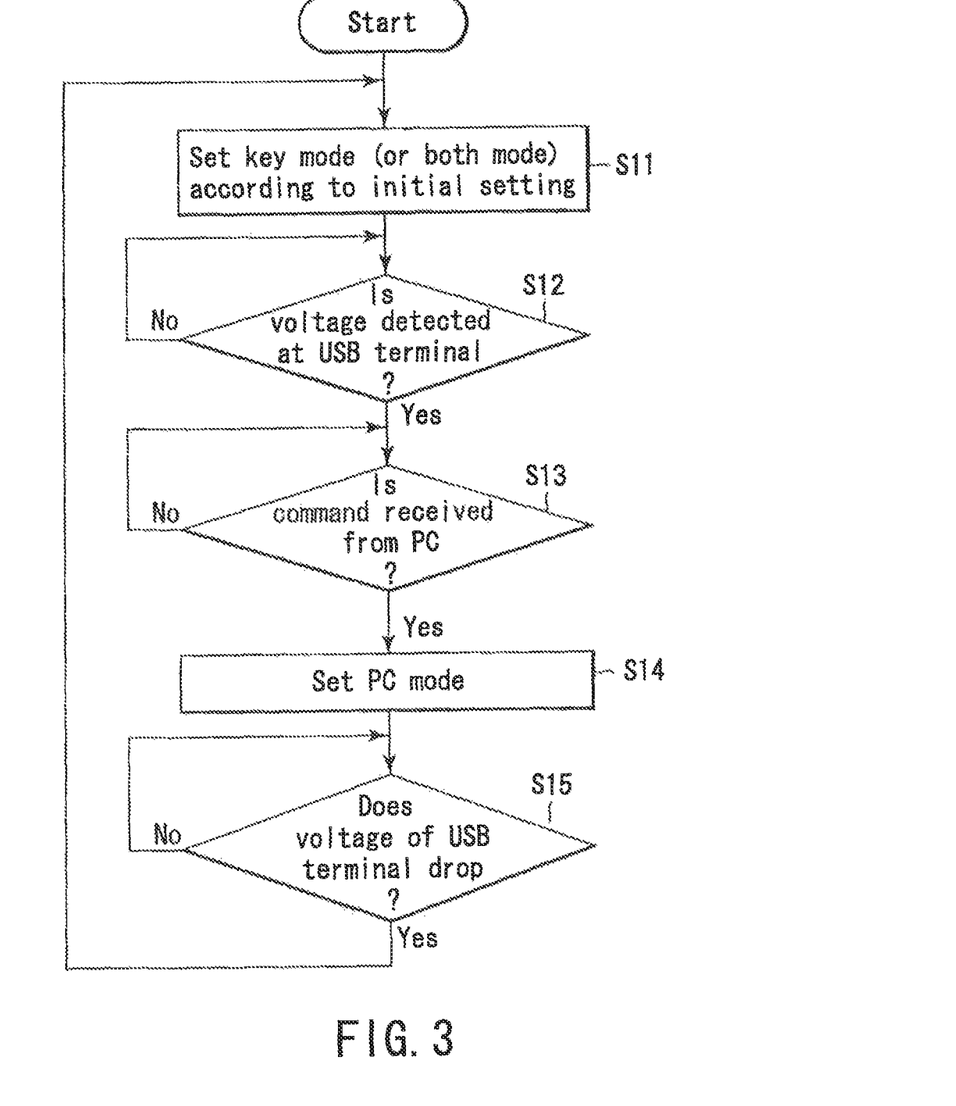
FIG. 3 is a flowchart showing an example of the operation mode determining process for a digital data recording and reproducing apparatus according to the invention.

In the flowchart of FIG. 3, the digital data recording and reproducing apparatus 10, when the operation switch 29 is turned on, the key mode is set as an operation mode (S11) in accordance with the initial setting recorded in the preset RAM 11 or the like or the initial setting designated by the user under the control of the CPU 24. In the key mode, the operating information of the digital data recording and reproducing apparatus 10 is supplied through the operation switch 29. As an alternative, a dual mode can be selected as an operation mode in which both the operating information supplied through the operation switch 29 and the control information supplied from the external PC 2 through the USB terminal 23 can be used as the operating information. In the dual mode, the digital data recording and reproducing apparatus 10 can be operated by the user through both the operation of the operation switch 29 on the body and the key operation from the PC 2.

Next, a predetermined potential (say, +5 V) at the power terminal T1 of the USB terminal 33 is detected by the potential detection section built in the power supply section 35 (S12). Then, the power supply section 35 stops supplying power through a battery, and begins to supply power based on a predetermined potential from the power terminal T1 to each part of the digital data recording and reproducing apparatus 10.

At the same time, the CPU 24 constituting a control unit detects, through the control information terminals T2, T3 of the USB terminal 33, a unique command of a control signal from the external PC 2 such as a device request signal acquired through the USB controller 34 (S13). The operation mode is changed from the initially set key mode (or the dual mode) to the PC mode (S14). The PC mode is an operation mode in which the digital data recording and reproducing apparatus 10 is operated by the control signal from the PC. Once this operation mode is selected, the operation switch 29 on the body becomes inoperative. Further, when the drop of the voltage applied to the USB terminal is recognized subsequently by the CPU 24 through the potential detection section of the power supply section 35 (S15), the operation mode is changed to the initially set key mode (or the dual mode) (S11).

As described above, with the digital data recording and reproducing apparatus 10 constituting the information processing system according to the invention, once a source potential is supplied from the USB terminal, it is not that only the PC mode prevails and the operation switch on the body becomes inoperative. Instead, the PC mode is entered only after detection of the predetermined information including a command such as a device request signal through the USB terminal. Thus, power can be supplied from an external PC or the power adaptor 6 through the USB terminal without any operating inconvenience.

Figure 4:
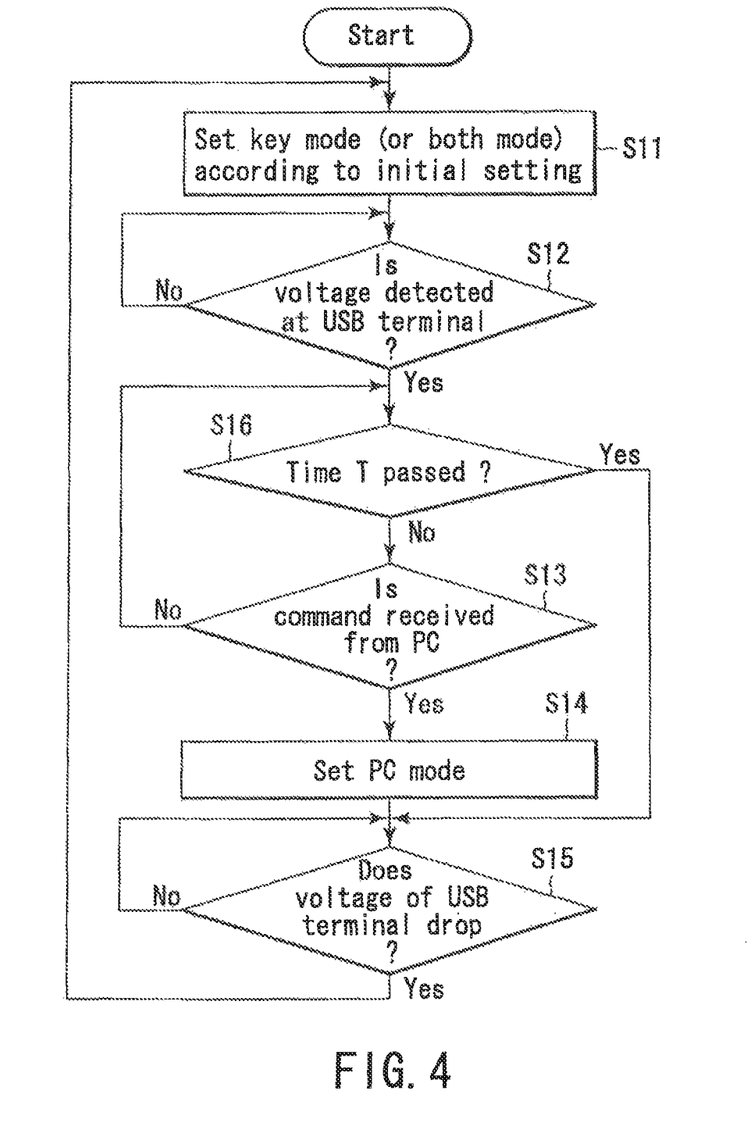
FIG. 4 is a flowchart showing another example of the operation mode determining process for a digital data recording and reproducing apparatus according to the invention.

The flowchart of FIG. 4 is substantially equivalent to the flowchart of FIG. 3. In the flowchart of FIG. 4, however, it is determined in step S16 whether a command is issued from the PC or not before the lapse of a predetermined time length T after power is supplied to the USB terminal 33. This time T may be either one second, ten seconds or 30 seconds. As a result, the power supplied from the power adaptor 6 is clarified with the lapse of time, and the unnecessary standby state is avoided while securing a higher operating stability.

Figure 5:
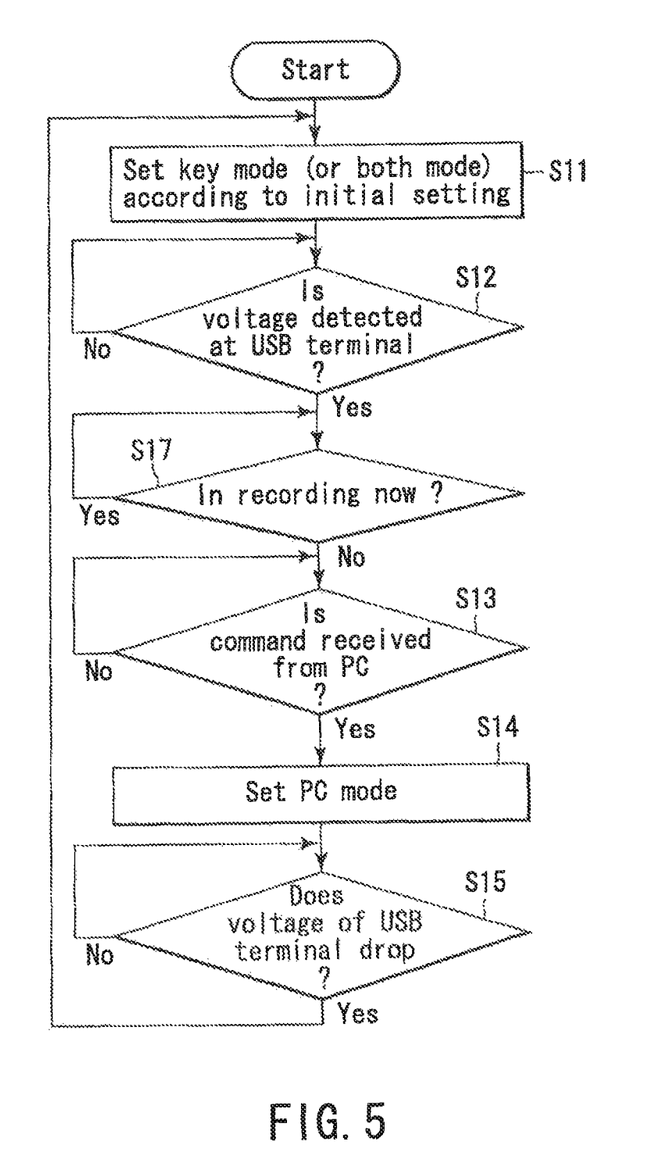
FIG. 5 is a flowchart showing still another example of the operation mode determining process for a digital data recording and reproducing apparatus according to the invention.

On the other hand, the flowchart of FIG. 5 is substantially equivalent to the flowchart of FIG. 3. In the flowchart of FIG. 5, however, it is determined in step S17 whether the digital data recording and reproducing apparatus 10 is conducting the sound recording operation (recording operation) or not when the source potential is supplied. Specifically, in the case where the sound recording process (or the image recording process) is being conducted, a transfer of the operation mode from key mode to PC mode is liable to suspend the sound recording process (or the image recording process). Therefore, the subsequent process of steps S13 to S15 is executed after confirming that the sound recording process (or the image recording process) has ended. Preferably, however, the operation mode is preferably set to the PC mode by forcible termination of the sound recording process (or the image recording process) without simply standing by for the termination. Also, the reproducing process and the editing process are preferably executed in the same manner as the sound recording process (or the image recording process) in this respect.

Figure 6:
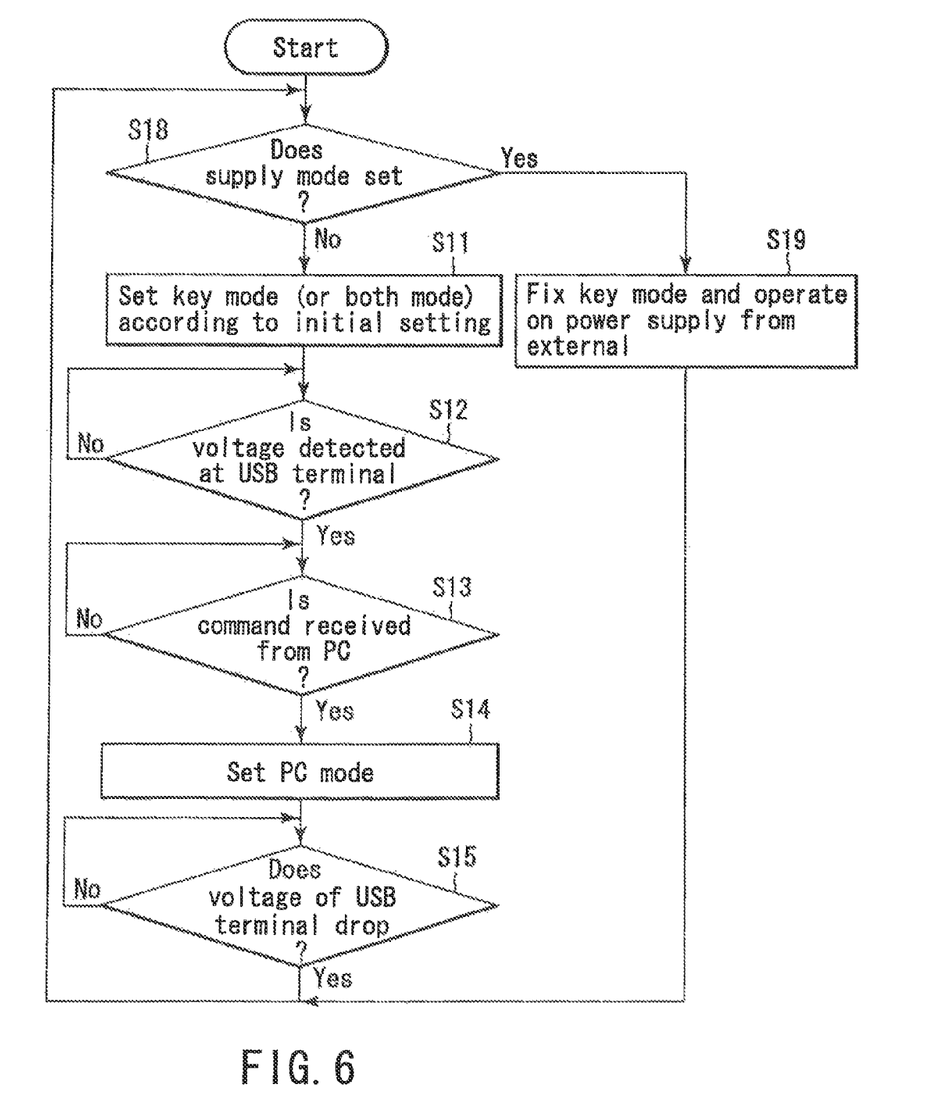
FIG. 6 is a flowchart showing yet another example of the operation mode determining process for a digital data recording and reproducing apparatus according to the invention.

The flowchart of FIG. 6 is substantially equivalent to the flowchart of FIG. 3. In the flowchart of FIG. 6, however, the supply mode can be set by the user operation through the operation switch 29 or the like as an initial setting of the operation mode in step S18. In the case where the supply mode is set (S18), the process of steps S11 to S15 is not executed, and the operation mode is fixed to the key mode (or the dual mode depending on the initial setting), before power is supplied through the USB terminal 33 from an external source. Once the supply mode is canceled, the process of steps S11 to S15 is executed as in the flowchart of FIG. 3. As a result, the digital data recording and reproducing apparatus 10 is operated by the power supplied from the power adaptor 6 shown in FIG. 2A on the one hand, while the system can be operated through the operation switch 29 on the body at the same time. Thus, no exclusive power terminal is required, and power can be supplied in stable fashion from the power adaptor 6 through the USB terminal 33.

According to the embodiment of the invention described above, the USB is used as an example of an interface. Nevertheless, the invention is not limited to this interface, but can use an IEEE (Institute of Electrical and Electronics Engineers) 1394 or an interface having another power terminal with equal effect.

Those skilled in the art can implement the invention in the various embodiments described above. Further, it is easy for those skilled in the art to conceive various modifications of the embodiments and the invention is applicable to various embodiments without any inventive step. Thus, this invention is widely applicable without departing from the principle and the novel features disclosed above, and not confined to the embodiments described above.

It will thus be understood from the foregoing detailed description that according to this invention, there are provided an information processing system and an information processing method in which the operation switch on the body is operated in accordance with the initial setting at the time point when a source potential is supplied to the USB terminal. Then, only after detection of the predetermined information from an external PC through the USB terminal, the system is operated in accordance with predetermined information such as a command supplied from the USB terminal. In this way, power can be supplied from the power adaptor through the USB terminal.

What is claimed is:
1. An electronic apparatus comprising:
a connection section configured to be connected with an external power supply socket, the connection section comprising a first terminal configured to receive external power from the external power supply socket, and a second terminal configured to receive a control signal comprising a command or a device request signal from an external device;
an information detection section configured to detect the device request signal from the external device;
an operation switch configured to supply operating information; and a controller configured to control a process based on one of a first mode and a second mode, the first mode being configured to perform the process in accordance with the operating information supplied from the operation switch, the second mode being configured to perform the process in accordance with the control signal, wherein the controller maintains the first mode when the connection section receives the external power from the external power supply socket, and when the information detection section does not detect the device request signal.

2. The electronic device according to claim 1, wherein the controller maintains the first mode when the information detection section does not detect the device request signal, and when external power is supplied from the external power supply socket via the connection section.

3. The electronic device according to claim 1, wherein the process is to reproduce voice or sound data based on one of the first operation mode and the second operation mode.

4. The electronic apparatus according to claim 2, further comprising a battery which supplies battery power to each component part.

5. The electronic apparatus according to claim 4, further comprising a power supply section configured to supply the external power to each component part in accordance with stopping the battery power by the battery.

6. An electronic apparatus comprising:
a connection section configured to be connected with an external device, the connection section comprises a first terminal configured to receive external power from the external device, and a second terminal configured to receive a control signal comprising a command or a device request signal from the external device;
an information detection section configured to detect the device request signal from the external device;
an operation switch configured to supply operating information; and
a controller configured to control a process based on one of a first mode and a second mode, the first mode being configured to perform the process in accordance with the operating information supplied from the operation switch, the second mode being configured to perform the process in accordance with the control signal, wherein the controller maintains the first mode when the connection section receives the external power from the external device, and when the information detection section does not detect the device request signal.

7. The electronic device according to claim 6, wherein the controller maintains the first mode when the information detection section does not detect the device request signal, and when external power is supplied from the external device via the connection section.

8. The electronic device according to claim 6, wherein the process is to reproduce voice or sound data based on one of the first operation mode and the second operation mode.

9. The electronic apparatus according to claim 7, further comprising a battery which supplies battery power to each component part.

10. The electronic apparatus according to claim 9, further comprising a power supply section configured to supply the external power to each component part in accordance with stopping the battery power by the battery.

11. The electronic apparatus according to claim 1, further comprising a recording section configured to record digital data to a memory card or an internal memory.

12. The electronic apparatus according to claim 11, further comprising an edit section configured to edit the digital data.

13. The electronic device according to claim 1, wherein the connection section corresponds to a USB terminal.

14. The electronic device according to claim 1, wherein the second mode does not perform the process in accordance with operating information supplied from the operation switch.

15. The electronic apparatus according to claim 6, further comprising a recording section configured to record digital data to a memory card or an internal memory.

16. The electronic apparatus according to claim 15, further comprising an edit section configured to edit the digital data.

17. The electronic device according to claim 6, wherein the connection section corresponds to a USB terminal.

18. The electronic device according to claim 6, wherein the second mode does not perform the process in accordance with operating information supplied from the operation switch.

* * * * *